(No Model.)

J. R. LITTLE.
METALLIC WHEEL.

No. 334,249. Patented Jan. 12, 1886.

Witnesses:
Jas. E. Hutchinson.
Edwin J. Prindle.

Inventor.
James R. Little
by Prindle and Russell
Attorneys

UNITED STATES PATENT OFFICE.

JAMES R. LITTLE, OF QUINCY, ILLINOIS, ASSIGNOR, BY MESNE ASSIGNMENTS, TO THE QUINCY METAL WHEEL COMPANY, OF SAME PLACE.

METALLIC WHEEL.

SPECIFICATION forming part of Letters Patent No. 334,249, dated January 12, 1886.

Application filed June 1, 1883. Serial No. 96,781. (No model.)

*To all whom it may concern:*

Be it known that I, JAMES R. LITTLE, of Quincy, in the county of Adams, State of Illinois, have invented certain new and useful Improvements in Metal Wheels for Agricultural Implements, &c.; and I do hereby declare that the following is a full, clear, and exact description thereof, reference being had to the accompanying drawings, in which—

Figure 1:
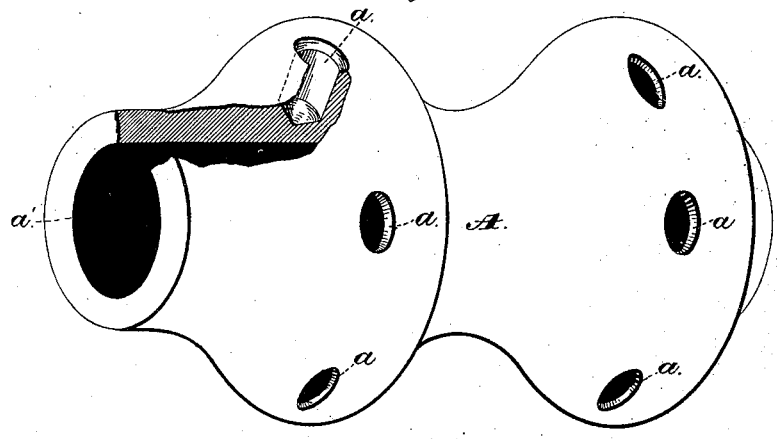
Figure 2:
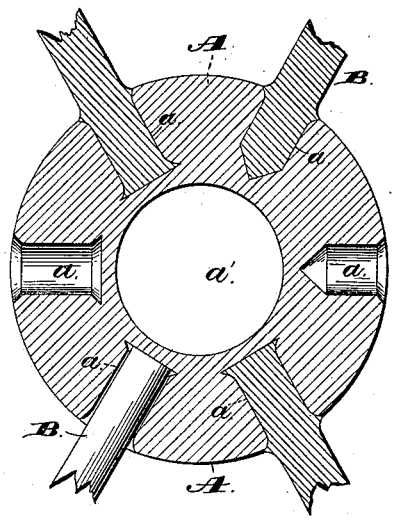

Figure 1 is a perspective view of the hub of my wheel, a portion of one side being broken away to show the interior construction; and Fig. 2 is a cross-section of the same upon a line with one row of spokes.

Letters of like name and kind refer to like parts in each of the figures.

The design of my invention is to enable the spokes of a metal wheel to be firmly and securely fastened within the hub; to which end said invention consists, principally, in a metal wheel in which each spoke is secured within a closed-end hub-mortise by compressing its inner end longitudinally until the same is caused to closely fill said mortise, substantially as and for the purpose specified.

It consists, further, in a metal wheel in which the hub is provided with radial mortises that are enlarged at their inner closed ends, and is combined with spokes which are fitted into said mortises, and by longitudinal compression are caused to closely fill the same, substantially as and for the purpose hereinafter set forth.

It consists, further, in a metal wheel in which the hub is provided with radial mortises that are closed at their inner ends, and is combined with spokes that are fitted into and caused to fill the same, and are larger at their inner ends and immediately outside of said mortises than at or within the central portion of the same, substantially as and for the purpose hereinafter specified.

It consists, finally, in a metal wheel in which the hub is provided with radial mortises, in combination with spokes that have their inner ends fitted into and enlarged to closely fill said mortises, and within the same have each a greater diameter than the diameter of its body, substantially as and for the purpose hereinafter shown.

In the construction of my wheel I use a metal hub, A, which is preferably provided with two rows of radial mortises, *a*, that pass nearly through into the axial opening *a'*. Said mortises are preferably constructed of larger diameter at their inner ends than near or at their outer ends, and have the latter enlarged or made flaring, but may, if desired, be straight throughout their entire length.

Fitted into each mortise *a* is a spoke, B, which is constructed from ordinary round iron, and has such diameter as to enable it to pass freely into said mortise. When thus in position, said spoke is firmly grasped at a point near the hub A, and by means of inward longitudinal compression against the bottom of its mortise is expanded laterally until caused to closely fill said mortise throughout its entire length, and to become practically a part of said hub. A spoke thus inserted within a hub has considerably greater diameter within and just outside of the same than along its body, and consequently is much stronger at the point of union with said hub and much less easily bent or broken at such point than at any other place.

The wheel as covered by this application differs from that shown, described, and claimed in my application No. 133,603, filed June 2, 1884, in that in the wheel covered by the latter application the mortises in the hub are open at both ends.

Having thus fully set forth the nature of my invention, what I claim as new is—

1. A metal wheel in which each spoke is secured within a closed-end hub-mortise by compressing its inner end longitudinally until the same is caused to closely fill said mortise, substantially as and for the purpose specified.

2. A metal wheel in which the hub is provided with radial mortises that are enlarged at their inner closed ends, and is combined with spokes which are fitted into said mortises and by longitudinal compression are caused to closely fill the same, substantially as and for the purpose set forth.

3. A metal wheel in which the hub is provided with radial mortises that are closed at their inner ends, and is combined with spokes that are fitted into and caused to fill the same, and are larger at their inner ends and immediately outside of said mortises than at or within the central portion of the same, substantially as and for the purpose specified.

4. A metal wheel in which the hub is provided with radial mortises, in combination with spokes that have their inner ends fitted into and enlarged to closely fill said mortises, and within the same have each a greater diameter than the diameter of its body, substantially as and for the purpose shown.

JAMES R. LITTLE.

Witnesses:
WM. W. BERRY,
WM. WEISENHORN.